United States Patent
Zhang

(10) Patent No.: US 11,619,642 B2
(45) Date of Patent: Apr. 4, 2023

(54) REACTION INCUBATION DEVICE, IMMUNITY ANALYZER AND REACTION INCUBATION METHOD

(71) Applicant: Shenzhen Increcare Biotech Co., Ltd, Shenzhen (CN)

(72) Inventor: Zhen Zhang, Shenzhen (CN)

(73) Assignee: Shenzhen Increcare Biotech Co., Ltd., Shenzhen (CN)

( * ) Notice: Subject to any disclaimer, the term of this patent is extended or adjusted under 35 U.S.C. 154(b) by 327 days.

(21) Appl. No.: 16/475,810

(22) PCT Filed: Oct. 30, 2017

(86) PCT No.: PCT/CN2017/108326
§ 371 (c)(1),
(2) Date: Jul. 3, 2019

(87) PCT Pub. No.: WO2018/126772
PCT Pub. Date: Jul. 12, 2018

(65) Prior Publication Data
US 2021/0132094 A1    May 6, 2021

(30) Foreign Application Priority Data
Jan. 6, 2017    (CN) .......................... 201710010509.8

(51) Int. Cl.
*G01N 35/02*    (2006.01)
*B01L 3/00*    (2006.01)
*G01N 35/00*    (2006.01)

(52) U.S. Cl.
CPC ............ *G01N 35/025* (2013.01); *B01L 3/502* (2013.01); *G01N 35/0092* (2013.01); *B01L 2200/025* (2013.01); *B01L 2300/0803* (2013.01)

(58) Field of Classification Search
CPC ............ G01N 35/025; G01N 35/0092; G01N 33/5304; G01N 2035/0444; B01L 3/502; B01L 2200/025; B01L 2300/0803
See application file for complete search history.

(56) References Cited

U.S. PATENT DOCUMENTS 5,360,597 A * 11/1994 Jakubowicz .......... B01F 31/201
                                                                          422/65
5,843,376 A    12/1998 Ishihara et al.
(Continued)

FOREIGN PATENT DOCUMENTS

CN    101275968 A    10/2008
CN    101393223 A    3/2009
(Continued)

OTHER PUBLICATIONS

Extended European Search Report for European Counterpart Application No. 17890462.9, dated Aug. 3, 2020, (8 pages).
(Continued)

*Primary Examiner* — Jill A Warden
*Assistant Examiner* — John McGuirk
(74) *Attorney, Agent, or Firm* — Kagan Binder, PLLC

(57) ABSTRACT

The invention discloses a reaction incubation device, an immunity analyzer and a reaction incubation method. The reaction incubation device comprises a reaction unit (10), which is used for bearing and incubating a reaction container; and a transfer unit (20), which is used for removing the reaction container in and out of the reaction unit (10). The reaction unit (10) comprises a rotating device (11). The rotating device (11) is provided with an incubation position which increases a predetermined angle θ at an interval of fixed time T along with the rotating device (11). The transfer unit (20) removes the reaction container out of the incubation position according to variable incubation time ti. With the device, flexible and variable incubation time can be (Continued)

achieved, and the problem of complicated control, low reliability and that high-speed automation is not easy to achieve in the prior art can be solved.

8 Claims, 3 Drawing Sheets

(56) References Cited

U.S. PATENT DOCUMENTS

| | | | |
|---|---|---|---|
| 2007/0172390 | A1 | 7/2007 | Ootani et al. |
| 2009/0071269 | A1 | 3/2009 | Sento et al. |
| 2012/0087830 | A1* | 4/2012 | Wakamiya ......... G01N 35/0092 422/67 |
| 2014/0093975 | A1 | 4/2014 | Wang et al. |
| 2018/0180607 | A1* | 6/2018 | Kubo ............... G01N 33/54326 |

FOREIGN PATENT DOCUMENTS

| | | |
|---|---|---|
| CN | 102998473 A | 3/2013 |
| CN | 104345158 A | 2/2015 |
| CN | 104714042 A | 6/2015 |
| CN | 106841645 A | 6/2017 |
| WO | 2012130107 A1 | 10/2012 |
| WO | 2018126774 A1 | 7/2018 |
| WO | 2018126775 A1 | 7/2018 |

OTHER PUBLICATIONS

Korean Office Action for Korean Counterpart Application No. 10-2019-7022785, dated Jul. 29, 2020, (5 pages).
Unpublished Utility U.S. Appl. No. 16/475,802, filed Jul. 3, 2019 (No Copy Enclosed).
Unpublished Utility U.S. Appl. No. 16/475,788, filed Jul. 3, 2019 (No Copy Enclosed).
Unpublished Utility U.S. Appl. No. 16/493,351, filed Sep. 12, 2019 (No Copy Enclosed).
International Search Report, and English Translation thereof, for International Application No. PCT/CN2017/108326, dated Jan. 24, 2018 (5 pages).

* cited by examiner

REACTION INCUBATION DEVICE, IMMUNITY ANALYZER AND REACTION INCUBATION METHOD

CROSS REFERENCE TO RELATED APPLICATIONS

The present disclosure is a national stage for International Application PCT/CN2017/108326, filed on Oct. 30, 2017, which claims priority benefit of Chinese Patent Application No. 201710010509.8 filed on Jan. 6, 2017, and entitled "Reaction Incubation Device, Immunity Analyzer and Reaction Incubation Method", the entire contents of both applications are incorporated herein for all purposes.

TECHNICAL FIELD

The present disclosure relates to a field of in-vitro diagnostic equipment, in particular to a reaction incubation device, an immunoassay analyzer and an automatic analysis apparatus and a reaction incubation method thereof.

BACKGROUND

Automatic immunoassay is based on immunological reactions in which antigen and antibody bind to each other, relates the optical or electrical signal to the analyte concentration through a series of cascade amplification reactions by labeling the antigen antibody with the enzyme label, lanthanide label or chemiluminescent agent, to analyze the antigen or antibody to be tested in the human sample, which is mainly applied in the clinical lab of the hospital, the third-party independent laboratory, the blood test center, etc., to perform quantitative, semi-quantitative or qualitative testing of the contents of various analytes in human body fluid, so as to diagnose the infectious disease, tumor, endocrine function, cardiovascular disease, prenatal and postnatal care, and the autoimmune disease.

Referring to FIGS. 1 and 2, the immunoassay can be generally divided into one-step protocol, time-delay one-step protocol, two-step protocol according to the test protocols. The main test steps generally include dispensing sample and reagent, mixing the reactants, incubating, and washing and separating (Bound-Free, referred to as B/F or washing for short), dispensing a signal reagent, measuring, etc. The incubation of the present disclosure specifically refers to the process of antigen-antibody binding reaction or biotin-avidin binding reaction of the reactants in the reaction vessel in a constant temperature environment of the reaction unit before the start of bound-free of the reaction vessel. Specifically, one-step protocol performs the incubation once, i.e., one incubation before entering the bound-free: time-delay one-step protocol performs the incubation twice, including a first incubation before the dispensing a second reagent and a second incubation before entering the bound-free; and the two-step protocol performs the incubation twice, including a first incubation before the first bound-free and a second incubation before a second bound-free. The test steps corresponding to different test protocols are detailed as follows.

1) One-step protocol: referring to FIG. 1, dispensing sample (S) and reagent (R), mixing (some test protocols may not need to mix, the same below, no longer repeat), incubating, bound-free after incubation, dispensing a signal reagent, performing signal incubation, and finally measuring. It should be pointed out that due to the different specific composition of the signal reagent, some luminescence systems do not require signal incubation, and can be directly measured during the process of dispensing the signal reagent or after dispensing the signal reagent.

2) One-step delay protocol: which differs from the one-step protocol in that the reagent is dispensed in twice, two incubations are required, the first incubation is performed after the first reagent is dispensed and mixed, and the second reagent is dispensed and mixed after the first incubation is finished. One more incubation, reagent dispensing, and mixing action than the one-step protocol, and the rest of the flow is the same as the one-step protocol.

3) Two-step protocol: which differs from the one-step protocol in that one more bound-free step, and the other steps are the same.

In the incubation steps of the above flow, the existing specific implementation technique solution are generally divided into two manners: fixed-time incubation and variable-time incubation. In the fixed-time incubation manner, all incubation testing time of each testing protocol are the same, for example, all one-step tests can only implement 20 minutes of incubation, and all two-step tests can only implement 10 minutes of the first incubation and 10 minutes of the second incubation, etc. Due to differences of a specific assay in the reagent material, formulation, production process, reaction principle and condition, such fixed-time incubation may increase the difficulty of the reagent development or sacrifice some test performances during the actual development and testing, such as sensitivity, etc., and thus is difficult to adapt to multiple different assays. Contrary to the constraints and limitations of the fixed-time incubation method on the reagent development and performance, the variable-time incubation method is flexible and adaptable, and can set the incubation time for different flexibility of each assay, i.e., each assay can implement its own optimum incubation time. The variable-time incubation method can reduce the constraint on the reagent development and gives full play to the performance of the reagent. In order to implement the variable-time incubation, the existing technical solution generally adopts an independent incubation tray only for implementing the incubation. The incubation tray needs multiple times of rotating and stopping in one test cycle, and the angle of each rotation is determined according to the incubation time. This technical solution has the disadvantages of complicated control, difficult technical implementation and unsuitable for high-speed automated testing and so on.

SUMMARY

In order to solve the deficiencies and problems ubiquitous in the prior art, the present disclosure provides a reaction incubation apparatus which is simple and reliable in control, flexible and efficient in the incubation flow and method, and an immunoassay analyzer having the reaction incubation apparatus, and also provides a reaction incubation method.

According to an aspect of the disclosure, a reaction incubation apparatus includes: a reaction unit configured to carry and incubate a reaction vessel, a transferring unit configured to transfer the reaction vessel into or out of the reaction unit; in which the reaction unit includes a rotating apparatus provided with an incubation position, the incubation position is advanced by a predetermined angle θ at an interval of fixed time T with the rotating apparatus; the transferring unit transfers the reaction vessel out of the incubation position according to a variable incubation time $t_1$.

According to another aspect of the disclosure, an immunoassay analyzer is provided with the reaction incubation apparatus.

According to another aspect of the disclosure, a reaction incubation method is provided, which includes: a transferring-in step: a transferring unit transfers a reaction vessel containing reactants into an incubation position of a reaction unit; an incubating step: the reaction vessel is carried forward by a predetermined angle θ at an interval of fixed time T in the incubation position with a rotating apparatus, and incubated for a variable incubation time $t_1=(\Omega/\theta)T$; where the $\Omega$ is a total forward angle of the reaction vessel in the incubation position with the rotating apparatus, and the $\Omega$ is an integer multiple of the θ; a transferring-out step: the transferring unit transfers the reaction vessel out of the incubation position of the reaction unit after an incubation time $t_1$.

The reaction incubation apparatus of the disclosure is carried forward by a predetermined angle θ at an interval of fixed time T, and the transferring unit transfers the reaction vessel out of the incubation position according to the variable incubation time t1.

The disclosure can not only implement flexible and variable incubation time and make the control simple and efficient, but also simultaneously implement washing and/or measuring on the reaction incubation apparatus, such that the structure of the immunoassay analyzer is more simple, reliable, compact and the cost is lower, thereby effectively solving the problems in the prior art that in order to implement the variable incubation time, the control is complicated, the reliability is low, the high-speed automation is difficult to implement, and the washing and/or measuring cannot be simultaneously implemented.

DETAILED DESCRIPTION OF DISCLOSED EMBODIMENTS

The present disclosure will be further described in detail below through embodiments with reference to the accompanying drawings.

A reaction incubation apparatus provided by the present disclosure includes: a reaction unit configured to carry and incubate a reaction vessel; and a transferring unit configured to move the reaction vessel into and out of the reaction unit. The reaction unit includes a rotating apparatus provided with an incubation position. The incubation position is advanced by a predetermined angle θ at an interval of fixed time T with the rotating apparatus. The transferring unit moves the reaction vessel out of the incubation position according to a variable incubation time t1.

Figure 1:
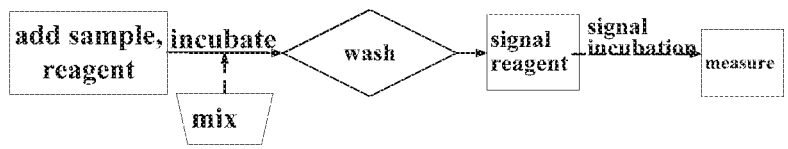
FIG. 1 is a schematic diagram of a one-step protocol reaction mode.
Figure 2:
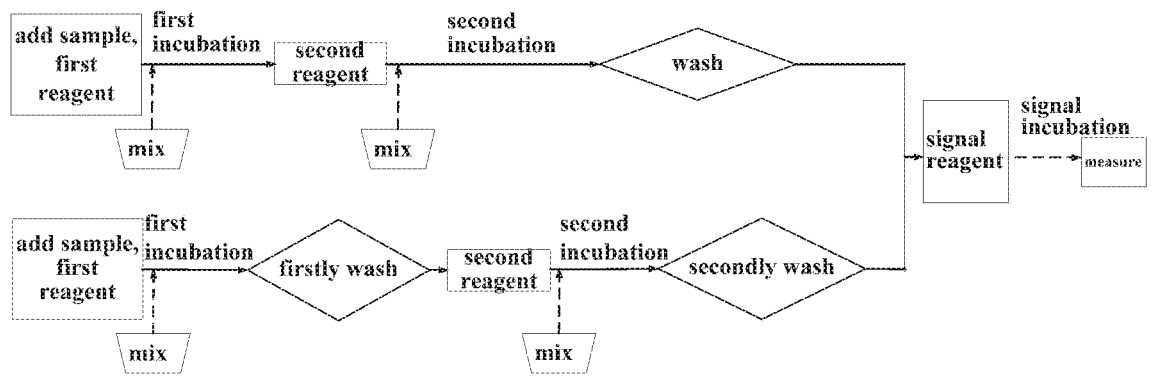
FIG. 2 is a schematic diagram of a one-step delay protocol and two-step protocol reaction mode.
Figure 3:
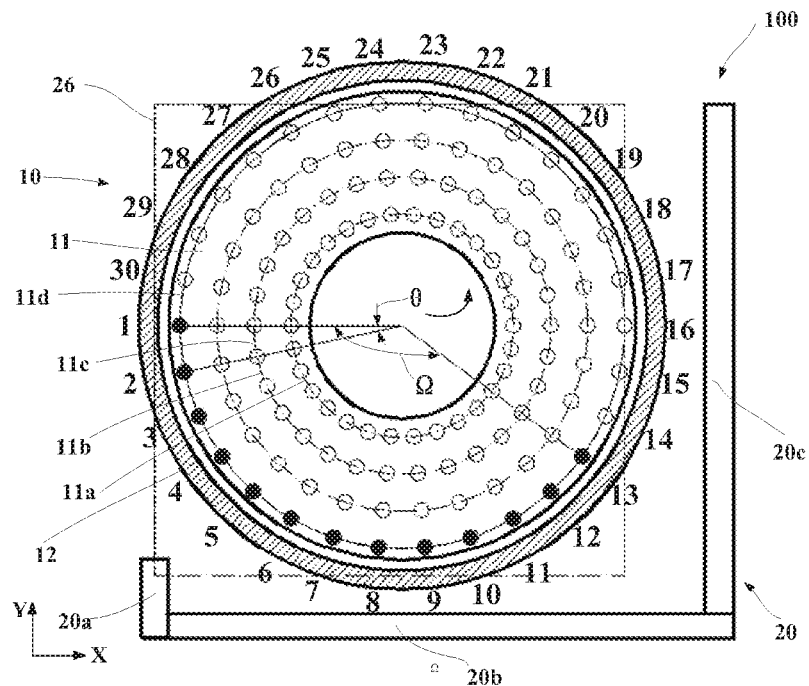
FIG. 3 is a schematic diagram of a reaction incubation apparatus according to a first embodiment of the present disclosure.

A first embodiment of the reaction incubation apparatus of the present disclosure is described with reference to FIG. 3. The reaction incubation apparatus 100 mainly includes a reaction unit 10 (including a rotating device and a heat preservation device), a transferring unit 20, and the like. The function and role of each part are respectively described below.

The reaction unit 10 carries and incubates a reaction vessel containing the reactant. The reaction unit 10 mainly includes the heat preservation device and a rotating device. The periphery of the heat preservation apparatus usually has a heat insulating material such as heat preservation cotton, and a heating apparatus and a sensor may be disposed on the side or the bottom inside of the heat preservation apparatus, and the upper portion thereof is generally a cover plate structure, etc., to provide a constant temperature incubation environment for the reaction unit and prevent or reduce heat loss of the reaction unit. Of course, for higher heat transferring efficiency, the heating apparatus can also be mounted on the rotating apparatus. Preferably, the number of the rotating apparatus is one, which includes a driving mechanism, a transmission mechanism and an associated control circuit, etc., to control and drive the rotating apparatus to rotate by a predetermined angle θ at an interval of fixed time (such as a cycle or a cycle T), and carry the reaction vessel forward by a certain position (such as advancing by a reaction vessel position). The rotating apparatus is provided with a plurality of independent holes, periods, brackets, bases or other structures suitable for carrying the reaction vessels, which are defined as the reaction vessel positions. In the present disclosure, the heat preservation apparatus of the reaction unit 10 is a pot body 12 and an upper cover (not shown), and the rotating apparatus is a reaction tray 11. The reaction tray 11 is rotatable about a central axis, and is provided with four circles of reaction vessel positions (11a, 11b, 11c, 11d) centered on the center of rotation. Of course, the number of the circle can be changed, for example, one circle, two circles, 3 or more circles, etc. each circle is provided with several reaction vessel positions, and the number of the reaction vessel positions on each circle may be the same or different. In this embodiment, 30 reaction vessel positions are provided at each circle, and the reaction vessel positions on the four circles are all incubation positions for receiving and incubating the reaction vessels containing the reactants. In order to indicate a physical position of some reaction vessel on the rotating apparatus at a certain time, an absolute coordinate system is set, and the number is progressively increased counterclockwise as 1, 2, 3 . . . 30.

The transferring unit 20 transfers the reaction vessel between different positions of the reaction incubation apparatus 100. The transferring unit can be any suitable mechanism which can transfer or move the reaction vessel. The preferred transferring unit of the present disclosure mainly includes a driving mechanism, a horizontal movement mechanical arm, a gripping-releasing mechanism, and the like. The gripping-releasing mechanism is usually mechanical fingers, which can grip and release the reaction vessel. The horizontal movement mechanical arm can be driven by the driving mechanism to move the gripping-releasing mechanism along the X direction, the Y direction, the X direction and the Y direction, the radial direction, the circumferential direction, the radial direction and the circumferential direction, etc., so as to move the reaction vessel caught by the gripping-releasing mechanism to different positions. In addition to the horizontal movement, the transferring unit 20 can also move up and down, to place the reaction vessels in different positions or taking them out of the different positions. According to the different testing speed and overall layout, one or more transferring units may be provided. In the embodiment, one transferring unit 20 is provided, which can do three-dimensional motion, such that whole apparatus is more compact and the cost is lower. The transferring unit 20 includes an X-direction movement mechanical arm 20a, a Y-direction movement mechanical arm 20b, a Y-direction guide rail 20c, a vertical movement mechanism and mechanical fingers (not shown). The transferring unit 20 can simultaneously move the mechanical fingers horizontally along the X direction and the Y direction, and the horizontal movement range covers a range within a boundary rectangle 26, i.e., all the reaction vessel positions (incubation positions) on the reaction tray 11 are within the horizontal movement range of the transferring unit 20. In this way, the transferring unit 20 can implement the flexible incubation time through placing the reaction vessels in different incubation positions or transferring the reaction vessels out of different incubation positions.

The reaction tray 11 is rotated by a predetermined angle θ (in the present embodiment, θ=12 degrees) at an interval of fixed time T (in the present embodiment, T=24 s, which is a time of one test cycle), and can be rotated counterclockwise or clockwise, for example, rotated by 12 degrees counterclockwise every 24 seconds and advanced by one reaction vessel position. As for the time sequence of actions of the reaction tray, reference is made to FIG. 4, Tm and Tn respectively represent the m-th test cycle and the n-th test cycle, and the reaction tray 11 is rotated and advanced during the time cycle $C_5$-T and stopped at other times. The transferring unit 20 can move the reaction vessel into or out of the incubation position on the reaction tray 11 in the stop time period after each rotation of the reaction tray 11. The transferring unit 20 places the reaction vessel in the incubation position in a time period of $C_1$ to $C_2$ and moves the reaction vessel out of the incubation position in a time period of $C_3$ to $C_4$. In the present embodiment, $C_0=C_2-C_1=0.2$ minutes, which is a time difference between moving the reaction vessel in and out of the incubation position on the reaction tray in one test cycle, which is usually a constant. If a certain reaction vessel containing a reactant is placed in a certain reaction vessel position of the reaction tray in the time period $C_1$ to $C_2$ of the Tm cycle, and the reaction vessel is moved out of the reaction vessel position in period $C_3$ to $C_4$ of the n-th test cycle Tn, then the incubation time is $t_1=(\Omega/\theta)T+C_0=((m-n)\theta/\theta)T+C_0=(m-n)T+C_0$.

Figure 4:
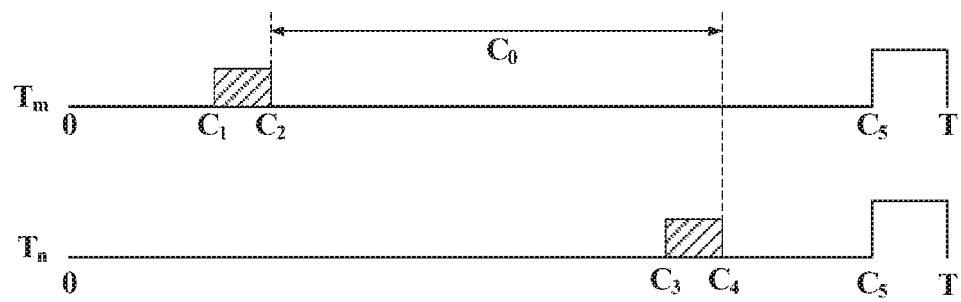
FIG. 4 is a schematic timing diagram of actions of a reaction tray of the present disclosure.
Figure 5:
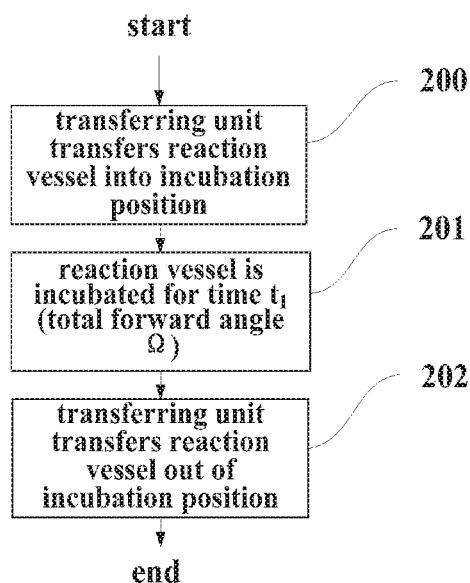
FIG. 5 is a schematic diagram of incubation steps of the present disclosure.

In the following description, a one-step protocol test for 5 minutes of incubation is taken as an example, and the reaction incubation flow and steps of the reaction incubation apparatus 100 are briefly described with reference to FIGS. 3 to 5.

Step 200: the transferring unit moves the reaction vessel into the incubation position. In the stop time period (time $C_1$ to $C_2$) while the reaction tray 11 stops rotating, the transferring unit 20 transfers the reaction vessel containing the reactant to an incubation position at an absolute positions 1, which may be located in any one of the four circles, for example, the incubation position on the outer circle 11d at the absolute position 1 is selected.

Step 201: reaction vessel incubation time t1. The reaction vessel is rotated counterclockwise by a predetermined angle θ=12° with the reaction tray 11 every cycle T=24 seconds, and carried forward by one reaction vessel position. After 12 cycles T, the total angle Ω of the reaction vessel in the incubation position carried forward with the rotating apparatus is 144° at the absolute position 13, and the implemented incubation time is $t_1=(\Omega/\theta) T+C_0=4.8+0.2=5$ minutes. In this embodiment, the constant $C_0=0.2$ minutes.

Step 202: the transferring unit moves the reaction vessel out of the incubation position. After the incubation time $t_1$, the transferring unit 20 moves the reaction vessel containing the reactant out of the incubation position on the outer circle 11d at the absolute position 13 within the stop time period (time $C_3$ to $C_4$) during which the reaction tray stops rotating.

Those skilled in the art should understand that, as for the one-step delay protocol and two-step protocol that require two incubations, the variability of each incubation time can be implemented in accordance with a similar flow and method.

As can be seen from the above description, in the present embodiment, the variable incubation time implemented in the incubation position is $t_1=(\Omega/\theta)T+C_0$, where Ω is the total angle of the reaction vessel in the incubation position carried forward with the rotating apparatus, and Ω is an integral multiple of θ, $C_0$ is a constant no greater than T. In particular, in the present embodiment, in order to implement longer incubation time, the total angle Ω of the reaction vessel in the incubation position on the reaction tray carried forward with the reaction tray includes a value greater than 360°, i.e., the variable incubation time $t_1$ includes a value greater than (360°/θ) T. In this way, the reaction vessel is rotated and carried forward in the incubation position with the reaction tray, and the transferring unit moves the reaction vessel into or out of the incubation position on the reaction tray at a different position, thereby implementing a flexible and variable incubation time.

As can be seen from the above description, in the present embodiment, the reaction tray is advanced by a predetermined angle at an interval of fixed time, to transfer the incubation position thereon to different positions. The horizontal movement range of the transferring unit covers all the incubation positions on the reaction tray, and can move the reaction vessel in or out of the incubation position from different positions. Through this layout and coordinated action of the transferring unit and the reaction tray, not only flexible incubation time can be implemented, but also the multiple rotating and stopping and the uncertainty of each rotating angle of the reaction tray in one cycle in the prior art can be avoided, thereby reducing the control difficulty and complexity, and improving the testing efficiency of the whole apparatus.

Figure 6:
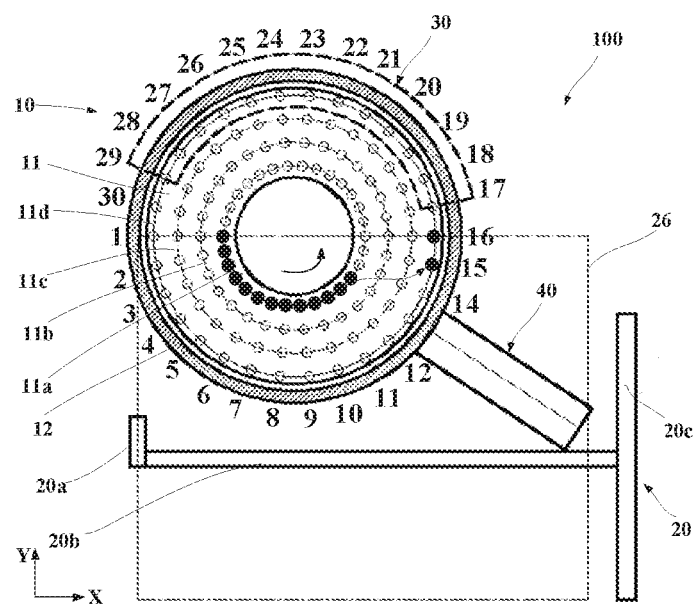
FIG. 6 is a schematic diagram of a reaction incubation apparatus according to a second embodiment of the present disclosure.

As for a second embodiment of the invention, reference is made to FIG. 6. The main difference between the second embodiment and the first embodiment is that the reaction incubation apparatus 100 is further provided with a bound-free (B/F) apparatus 30 and a measuring apparatus 40. In addition, in the first embodiment, the reaction vessel positions of four circles of the reaction unit are incubation positions; however, in the second embodiment, only the reaction vessel positions of the inner three circles are the incubation positions to mainly implement the incubation function, and the reaction vessel positions of the outer circle mainly implements the washing and measuring function. It should be noted that the reaction vessel positions of the outer circle can implement partial incubation function "by the way" in the process of the carrying the reaction vessels to the B/F and measuring apparatus. In addition to provide an incubation environment, the heat preservation apparatus of the present embodiment can further support and fix a magnetic field generating apparatus of the B/F apparatus 30 to provide a magnetic field environment for the washing. In addition, the heat preservation apparatus can not only provide the mounting position for the measuring apparatus 40, but also implement the darkroom environment required by the measuring apparatus 40. The B/F apparatus 30 includes a magnetic field generating apparatus and a flushing mechanism. The magnetic field generating apparatus provides a magnetic field environment for adsorbing paramagnetic particles in the reaction vessel to the inner wall of the reaction vessel. Due to factors such as response time, moving distance and resistance in the magnetic field, it takes a certain time for the paramagnetic particles to adsorb to the inner wall of the reaction vessel, usually ranging from several seconds to several tens of seconds, so that before draining the waste liquid (including unbound component) each time, the reaction vessel needs to pass through the magnetic field for a period of time. Preferably, the magnetic field generating apparatus of the present disclosure can be directly mounted or fixed on the heat preservation apparatus of the reaction unit, thereby not only saving additional fixing mechanism, reducing the cost, but also bringing the magnetic field generating apparatus closer to the reaction vessel position, thereby reducing adsorption time of the paramagnetic particles and improving the washing efficiency. The flushing mechanism includes a liquid drawing and injecting apparatus, in which the liquid drawing apparatus draws the unbound components in the reaction vessel and the liquid injecting apparatus injects a washing buffer into the reaction after the drawing. The liquid drawing apparatus includes a liquid drawing part suitable for drawing the liquid, such as a liquid drawing needle, a liquid drawing tube or a liquid drawing nozzle, and the liquid drawing part is arranged above the reaction unit, and can be driven into and out of the reaction vessel in the reaction vessel position through the driving mechanism to draw the unbound components in the reaction vessel. The liquid injecting apparatus includes a liquid injecting part suitable for discharging the liquid, such as a liquid injecting needle, a liquid injecting tube, a liquid injecting mouth and the like, and the liquid injecting part is also arranged above the reaction vessel position of the reaction unit, and injects the washing buffer into the reaction vessel after the drawing. Each flushing includes a process of a single drawing of liquid and a single injecting of the washing buffer. Usually the flushing is performed three or four times, i.e., three or four flushing, of course the times of the flushing can be varied. In order to make the cleaning more thorough and less residue, it is also possible to dispose a mixer in the liquid injecting position to mix the reaction vessel, or use the impact force to make the paramagnetic particles resuspended and uniformly dispersed in the washing buffer when or after injecting the washing buffer. When the reaction tray of the reaction unit transfers the reaction vessel to the B/F apparatus 30, the B/F apparatus 30 starts to wash and separate the reaction vessel. In addition, in order to simplify the mechanism, the B/F apparatus 30 may further be coupled with a signal reagent dispensing mechanism so as to add all or part of the signal reagents after completing the washing of the reaction vessel, for example, all the first and second signal reagents are added, or only the first signal reagent is added, etc., and the remaining signal reagents can be added when performing the measurement. This can make full use of the function of the B/F mechanism, reduce the volume of the mechanism and save the cost. It can be seen from the above description that the B/F apparatus 30 is disposed around the reaction tray of the reaction unit or above the reaction tray, and can directly wash and separate the reaction vessel on the reaction tray of the reaction unit, so as to avoid disposing an independent B/F rotating apparatus, such as an independent B/F carousel or B/F rail, etc., thus not only the components and the whole apparatus are simplified such that the whole apparatus is more compact and the cost is lower, but also the transferring of the reaction vessel between the independent B/F apparatus and the reaction unit is avoided such that the control flow of the immunoassay analyzer is simpler and more efficient, thereby increasing the processing efficiency and reliability.

The measuring apparatus 40 measures the signal in the reaction vessel. The signal is an electrical signal, a fluorescent signal or a weak chemiluminescence signal generated after adding the signal reagent into the reaction vessel. The measuring apparatus 40 includes a weak photodetector photomultiplier tube (PMT) or other sensitive photo-sensing apparatus that can convert the measured optical signal into an electrical signal and transmit the electrical signal to the control center. Furthermore, in order to improve the measurement efficiency and ensure the measurement uniformity, the measuring apparatus 40 may further include optical apparatus such as optical signal collecting and calibrating apparatus. The weak chemiluminescence signal is taken as an example, in order to avoid the interference of the ambient light, the measuring apparatus 40 of the present disclosure is mounted in a reaction unit to measure a reaction signal in a reaction vessel position of the reaction unit. This may make full use of the reaction vessel position on the reaction unit, to make the whole apparatus more compact and the cost less.

According to the test condition, the reaction vessel needed to be incubated is first incubated in the incubation position of the third inner circles 11a, 11b, 11c for a certain time or after completing the incubation, and then transferred to the outer circumference of the reaction tray for washing and measuring or transferred to a position other than the reaction incubation apparatus 100 to perform the corresponding operation. It should be noted that the reaction vessel can complete the incubation on the three inner circles 11a, 11b, 11c, and then the reaction vessel is transferred to the outer circle 11d for washing, or after completing a certain cycle of incubation on the three inner circles 11a, 11b, 11c, for example, the incubation for the most of time is completed, then transferred to the outer circle 11d, and then the incubation for the remaining time is completed during the process of transferring the reaction tray to the magnetic separation apparatus. In the former implementation, the outer circle 11d does not require an additional reaction vessel position for the incubation, which allows the reaction tray to be smaller in size and lower in cost. For the latter implementation, for example, if a tested reaction vessel needs to be incubated for twenty-five minutes, it is possible to complete the incubation for the most of time, such as 24 minutes, on one or several circles of the three inner circles 11a, 11b, and 11c, and then the reaction vessel is transferred to the outer circle 11d and the incubation for the remaining 1 minute is completed before transferring to the B/F unit. This kind of solution can appropriately reduce the number of incubation positions on the three inner circles because the outer circle shares a portion of the incubation function, thereby balancing the number of incubation positions on the inside and outer circles, so as to optimize the size of the reaction tray and fully utilize the internal space of the reaction tray.

It should be understood by those skilled in the art that the reaction incubation flows and steps of the present embodiment are similar to those of the first embodiment. Similarly, with reference to FIGS. 3-5, a test of incubation for 5.8 minutes is taken as an example to describe the reaction incubation flows and steps of the reaction incubation apparatus 100.

Step 200: the transferring unit transfers the reaction vessel into the incubation vessel: in the stop period of time (time $C_1$ to $C_2$) during which the reaction tray 11 stops rotating, the transferring unit 20 transfers the reaction vessel containing the reactant to the incubation position at the absolute position 1, which may be any one of the three inner circles, such as the incubation position on the inner circle 11a at the absolute position 1 is selected.

Step 201: the reaction vessel is incubated for time $t_1$: the reaction vessel is rotated counterclockwise by a predetermined angle $\theta=12°$ every cycle $T=24$ seconds with the reaction tray 11, and is carried forward by one reaction vessel position. After twelve cycles of T, the reaction vessel in the incubation position is carried forward by a total angle $\Omega=144°$ with the rotating apparatus to the absolute position 13, and the implemented incubation time is $t1=(\Omega/\theta)T+C_0=4.8+0.2=5$ minutes. In this embodiment, the constant $C_0=0.2$ minutes.

Step 202: The transferring unit transfers the reaction vessel out of incubation position: after the incubation time $t_1$, the transferring unit 20 transfers the reaction vessel containing the reactants out of the incubation position on the inner circle 11a at the absolute position 13 in the stop period of time (time $C_3$ to $C_4$) during which the reaction tray stops rotating.

If the incubation is performed for time $t_1$ or the incubation is completed, the test requires washing and measuring, then the transferring unit 20 transfers the reaction vessel to the reaction vessel position on the outer circle 11d at the absolute position 15. According to different test conditions, the reaction vessel can continue to be incubated for time $t_0$ ($t_0 \geq 0$, which is the incubation time of the reaction vessel implemented in other position other than the incubation position of the rotating apparatus) on the outer circle 11d before transferring to the B/F apparatus 30, or is no longer incubated but directly transferred to the B/F apparatus 30. In this embodiment, after the transferring unit 20 transfers the reaction vessel to the reaction vessel position on the outer circle 11d at the absolute position 15 and after two more cycles, the reaction vessel passes through the B/F apparatus 30, so the implemented incubation time on the outer circle 11d is to =48 seconds. Therefore, the total incubation time that can be implemented by the automatic reaction incubation apparatus 100 of the present embodiment is $t=t_1+t_0=5.8$ minutes. After the completion of the incubation, the reaction vessel is transferred under the rotation of the reaction tray 11 to pass through the B/F apparatus 30 and subjected to multi-stage washing by the B/F apparatus 30: and when passing through the measuring apparatus 40 under the rotation of the rotating tray, the measuring apparatus 40 measures the signal in the reaction vessel. It should be noted that, in other embodiments, after transferring the reaction vessel out of the incubation position but before passing into the B/F apparatus 30, the incubation may not be continued, then the total incubation time is $t=t_1=5$ minutes.

Those skilled in the art may appreciate that for the one-step delay and two-step protocol that requires two incubations, this embodiment can also implement the variability of each incubation time in a similar manner.

As can be seen from the above description, in the present embodiment, the variable incubation time implemented by the incubation position of the reaction tray is $t_1=(\Omega/\theta)T+C_0$, where $\Omega$ is the total forward angle of the reaction vessel in the incubation position with the rotating apparatus, and $\Omega$ is an integer multiple of $\theta$, and $C_0$ is a constant not greater than T. In particular, in the present embodiment, in order to implement a longer incubation time, the total forward angle $\Omega$ of the reaction vessel in the incubation position of the reaction tray with the rotating apparatus includes a value greater than 360°, i.e., the variable incubation time $t_1$ includes a value greater than $(360°/\theta)$ T. In this way, the reaction vessel is carried forward in the incubation position with the rotation of the reaction tray, and the transferring unit transfers the reaction vessel into or out of the incubation position of the reaction tray from different positions, thereby implementing a flexible and variable incubation time.

Figure 7:
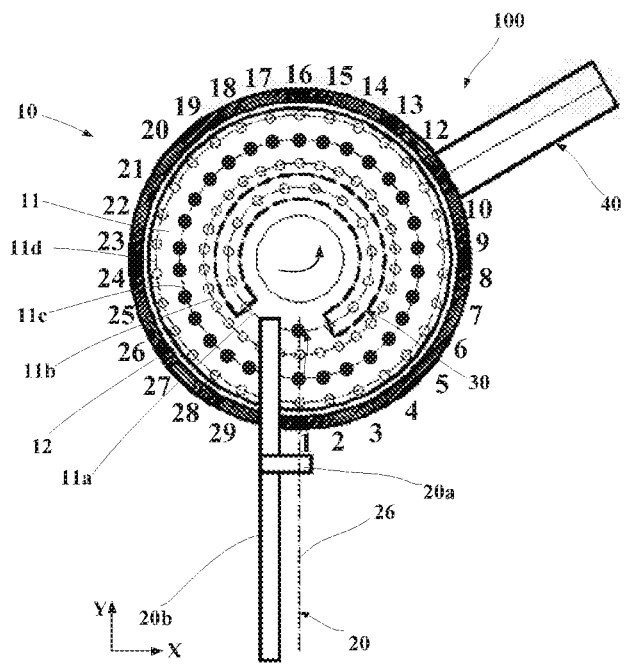
FIG. 7 is a schematic diagram of a reaction incubation apparatus according to a third embodiment of the present disclosure.

A third embodiment of the present disclosure is shown in FIG. 7. This embodiment differs from the second embodiment mainly in the transferring unit 20 and the B/F apparatus 30. In the present embodiment, the number of the transferring unit 20 is one, which can perform longitudinal horizontal and vertical two-dimensional movement, such that the whole apparatus is more compact and the cost lower. The transferring unit 20 includes a mechanism such as a Y-direction guide rail 20b, a Y-direction movement mechanical arm 20a, a vertical movement mechanism and mechanical fingers (not shown) and the like. The transferring unit 20 can move the mechanical fingers horizontally along the Y direction, and the horizontal movement track is 26, i.e., the reaction vessel position at the absolute position 1 on the reaction tray 11 is in the horizontal movement range of the transferring unit 20, so that the transferring unit 20 can place the reaction vessel into or transfer the reaction vessel out of the reaction vessel position at the absolute position 1. In the present embodiment, the B/F apparatus 30 is arranged on the inner circle of the reaction unit, which not only makes the B/F apparatus more compact, but also reduces the adverse effects such as temperature fluctuation, interference due to introduction of ambient light, etc., on the measurement caused by the B/F apparatus.

In the embodiment, the reaction vessel positions on the middle two circles 11b, 11c are the incubation positions, which mainly implement the incubation function. The reaction vessel position on the inner circle 11a mainly implements the function of washing. The reaction vessel position on the outer circle 11d mainly implements the function of measurement. Of course, the reaction vessel position on the inner circle 11a can also implement part of the incubation function in the process of transferring the reaction vessel to the B/F apparatus. During the test, the reaction vessel to be incubated is first transferred by the transferring unit 20 into one of the middle two circles 11b, 11c, after the incubation is completed or the incubation is performed in a certain period of time and the washing is required, the reaction vessel is transferred out of the middle two circles 11b, 11c and then into the inner circle 11a by the transferring unit 20; through the rotating transference of the reaction tray, the B/F apparatus 30 perform the multi-stage washing on the reaction vessel: when the washing is completed, the reaction vessel is transferred out of the inner circle 11d by the transferring unit 20; if the measurement is required, the transferring unit 20 transfers the reaction vessel into the outer circle 11d; and the reaction vessel is transferred to the measuring apparatus for measurement under the rotation of the reacting tray.

It should be appreciated by those skilled in the art that other units of the embodiment are the same as or similar to the second embodiment. The incubation flows and steps of the embodiment are described with reference to FIGS. 3-5, through taking a test of 12.6 minutes of incubation as an example to briefly describe the incubation flows and steps of incubation apparatus 100.

Step 200: the transferring unit transfers the reaction vessel into the incubation position: in the stop period of time (time $C_1$ to $C_2$) during which the reaction tray 11 stops rotating, the transferring unit 20 transfers the reaction vessel containing the reactants to the incubation position at the absolute position 1, which may be one of the middle two circles 11b, 11c, for example, the incubation position on the middle circle 11c at the absolute position 1 is selected.

Step 201: the reaction vessel is incubated for the time $t_1$: the reaction vessel is rotated counterclockwise by a predetermined angle $\theta=12°$ every cycle $T=24$ seconds with the reaction tray 11, and is carried forward by one reaction vessel position. After thirty cycles of T, the total forward angle of the reaction vessel at the incubation position with the reaction tray is $\Omega=360°$, i.e., the reaction vessel goes back to the absolute position 1, and the implemented incubation time is $t_1=(\Omega/\theta)T+C_0=12+0.2=12.2$ minutes. In this embodiment, the constant $C_0=0.2$ minutes.

Step 202: the transferring unit transfers the reaction vessel out of the incubation position: after the incubation is performed for the time $t_1$, the transferring unit 20 transfers the reaction vessel containing the reactants out of incubation position on the middle circle 11c at the absolute position 1 during the (time $C_3$ to $C_4$).

If the incubation is performed for the time $t_1$ or the incubation is completed and the test requires washing and measuring, the transferring unit 20 first transfers the reaction vessel to the inner circle 11a at the absolute position 1 for washing, and after thirty cycles of T, to the outer circle 11d at the absolute position for measuring. According to different test conditions, the reaction vessel can continue to be incubated for time to on the inner circle ($t_0 \geqslant \theta$, which is the incubation time implemented by the reaction vessel $\geqslant$ at a position other than the incubation position of the rotating apparatus) before being transferred to the B/F apparatus 30, or the reaction vessel is no longer incubated but directly transferred to the B/F apparatus 30. In this embodiment, after the transferring unit 20 transfers the reaction vessel to the inner circle 11a at the absolute position 1 and after one more cycle, the reaction vessel passes through the B/F apparatus 30, thus the implementable incubation time on the inner circle 11a is $t_0=24$ seconds. The total incubation time that can be implemented by the reaction incubation apparatus of this example is $t=t_1+t_0=12.6$ minutes. After the incubation is completed, the reaction vessel is transferred under the rotation of the reaction tray and passes through the B/F apparatus 30, the B/F apparatus 30 performs the multi-stage washing on the reaction vessel. When the reaction vessel is transferred back to the reaction vessel position on the inner circle 11a at the absolute position 1 after completing the washing, the reaction vessel is located under the movement track of the transferring unit 20, and is transferred to the outer circle 11d by the transferring unit 20 for measurement. When the reaction vessel is transferred under the rotation of the reaction tray to pass through the measuring apparatus 40, the measuring apparatus 30 measures the signal in the reaction vessel. It should be noted that in other embodiments, the reaction vessel does not continue to be incubated after being transferred out of the incubation position while before passing into the B/F apparatus 30, then the implemented total incubation time is $t=t_1=12.2$ minutes.

Those skilled in the art will appreciate that for the one-step delay and two-step protocol that requires two incubations, this embodiment can also implement the variability of each incubation time according to the incubation follows and method.

As can be seen from the above description, in the embodiment, the variable incubation time implemented by the incubation position is $t_1=(\Omega/\theta)T+C_0$, where $\Omega$ is the total forward angle of the reaction vessel in the incubation position with the rotating apparatus, $\Omega$ is an integral multiple of $\theta$, and $C_0$ is a constant not greater than T. In particular, in the embodiment, in order to implement two or more incubation time, the total forward angle $\Omega$ of the reaction vessel in incubation position of the reaction tray with the rotating apparatus includes at least one value greater than 360°, i.e., the variable incubation time $t_1$ includes at least one value greater than $(360°/\theta)$ T. In this way, the reaction vessel can be carried forward by multiple rounds in the incubation position with the rotation of the reaction tray, so as to implement a flexible and variable incubation time.

An embodiment of the present invention provides an immunoassay analyzer on which the reaction incubation apparatus is provided.

The embodiment of the present invention further provides a reaction incubation method, which specifically includes:

a transferring-in step: a transferring unit transfers a reaction vessel containing reactants into an incubation position of a reaction unit;

an incubating step: the reaction vessel is carried forward by a predetermined angle $\theta$ at an interval of fixed time T in the incubation position with the rotating apparatus, and the incubation is performed by a variable incubation time $t_1=(\Omega/\theta)T$, where the $\Omega$ is a total forward angle of the reaction vessel in the incubation position with the rotating apparatus, and the $\Omega$ is an integer multiple of the $\theta$:

a transferring-out step: the transferring unit transfers the reaction vessel out of the incubation position of the reaction unit after the incubation time $t_1$.

Furthermore, the total forward angle $\Omega$ of the reaction vessel with the rotating apparatus includes at least one value greater than 360°, i.e., the incubation time $t_1$ includes at least one value greater than $(360°/\theta)$ T. The total incubation time implemented by the reaction incubation method is $t=t_1+t_0$, where $t_0 \geqslant 0$, which is the incubation $\geqslant$ time implemented by the reaction vessel at a position other than the incubation position of the rotating apparatus.

The reaction incubation apparatus of the present disclosure is advanced by a predetermined angle $\theta$ at an interval of fixed time T, and the transferring unit transfers the reaction vessel out of the incubation position according to the variable incubation time t1. The disclosure can not only implement flexible and variable incubation time and make the control simple and efficient, but also simultaneously implement washing and/or measuring on the reaction incubation apparatus, such that the structure of the immunoassay analyzer is more simple, reliable, compact and the cost is lower, thereby effectively solving the problems in the prior art that in order to implement the variable incubation time, the control is complicated, the reliability is low, the high-speed automation is difficult to implement, and the washing and/or measuring cannot be implemented simultaneously.

The technical features or operational steps described in the embodiments of the present invention may be combined in any suitable manner. It will be readily understood by those skilled in the art that the order of the steps or actions in the methods described in the embodiments of the present invention can be changed. Therefore, unless otherwise stated in a certain order, any order in the drawings or the detailed description is merely for the purpose of illustration, but not a necessary order.

Various embodiments of the present invention may include various steps, which may be embodied as machine-executable instructions that can be executed by a general-purpose or special-purpose computer (or other electronic apparatus). Alternatively, these steps may be performed by hardware elements including a specific logic circuitry for performing the steps or by a combination of the hardware, software and/or firmware.

The present disclosure has been described through specific embodiments, but the disclosure is not limited to the specific embodiments. It will be appreciated by those skilled in the art that various modifications, equivalents, changes, and the like may be made without departing from the spirit and scope of the invention. In addition, the "one embodiment", "this embodiment" and the like described above in various places represent different embodiments, and of course, all or part of them may be combined in one embodiment.

The above-mentioned embodiments are merely illustrative of several embodiments of the present invention, and the description thereof is more specific and detailed, but is not to be construed as limiting the scope of the disclosure. It should be noted that a number of variations and modifications may be made by those skilled in the art without departing from the spirit and scope of the disclosure. Therefore, the scope of the invention should be determined by the appended claims.

What is claimed is:

1. A reaction incubation apparatus, comprising:
a reaction unit configured to carry and incubate one or more reaction vessels;
a transferring unit configured to transfer a selected reaction vessel of the one or more reaction vessels into or out of the reaction unit;
wherein the reaction unit comprises a rotating apparatus, the rotating apparatus comprising a reaction tray configured to rotate about a central axis and provided with a plurality of circles of reaction vessel positions each centered on and equidistant from the central axis, with an incubation position comprising at least one inner circle of the plurality of circles of reaction vessel positions, wherein the incubation position is configured to be advanced by a rotating of a predetermined angle $\theta$ at a test cycle interval of fixed time T with the rotating apparatus;
wherein the transferring unit is configured to transfer the selected reaction vessel out of the incubation position according to a variable incubation time $t_1$, wherein the incubation time $t_1$ satisfies $t_1=(\Omega/\theta)T+C_0$, the $\Omega$ is a total forward angle of the selected reaction vessel in the incubation position with the rotating apparatus, and the $\Omega$ is an integer multiple of the $\theta$, wherein $C_0$ is a constant no greater than T, wherein $C_0$ is a time period during which the rotating apparatus stops rotating while the transferring unit places the selected reaction vessel into a reaction vessel position of the incubation position; and
a bound-free (B/F) apparatus disposed above the reaction tray, the B/F apparatus configured to directly wash and separate one or more reaction vessels of the reaction tray;
wherein the reaction tray further comprises an outer circle of the plurality of circles of the reaction vessel positions, the outer circle comprising reaction vessel positions configured for implementing a washing function of one or more reaction vessels positioned at the outer circle of the reaction tray, wherein the reaction vessel positions of the outer circle are also configured for implementing a partial incubation function associated with a process of carrying the reaction vessels to the B/F apparatus; and
wherein a total incubation time t implemented by the rotating apparatus satisfies $t=t_1+t_0$, $t_0 \geq 0$, the time $t_0$ is a remaining time of incubation after the selected reaction vessel is transferred to a reaction vessel position of the outer circle, and after the incubation time of $t_1$ is completed in the incubation position.

2. The reaction incubation apparatus according to claim 1, wherein the total forward angle $\Omega$ of the selected reaction vessel in the incubation position with the rotating apparatus comprises at least one value greater than 360°, that is, the variable incubation time $t_1$ comprises at least one value greater than $(360°/\theta)T$.

3. An immunoassay analyzer comprising a reaction incubation apparatus, wherein the reaction incubation apparatus comprises:
a reaction unit configured to carry and incubate one or more reaction vessels;
a transferring unit configured to transfer a selected reaction vessel of the one or more reaction vessels into or out of the reaction unit;
wherein the reaction unit comprises a rotating apparatus, the rotating apparatus comprising a reaction tray configured to rotate about a central axis and provided with a plurality of circles of reaction vessel positions each centered on and equidistant from the central axis, with an incubation position comprising at least one inner circle of the plurality of circles of reaction vessel positions, wherein the incubation position is configured to be advanced by a rotating of a predetermined angle $\theta$ at a test cycle interval of fixed time T with the rotating apparatus;
wherein the transferring unit is configured to transfer the selected reaction vessel out of the incubation position according to a variable incubation time $t_1$, wherein the incubation time $t_1$ satisfies $t_1=(\Omega/\theta)T+C_0$, the $\Omega$ is a total forward angle of the selected reaction vessel in the incubation position with the rotating apparatus, and the $\Omega$ is an integer multiple of the $\theta$, wherein $C_0$ is a constant no greater than T, wherein $C_0$ is a time period during which the rotating apparatus stops rotating while the transferring unit places the selected reaction vessel into a reaction vessel position of the incubation position; and
a bound-free (B/F) apparatus disposed above the reaction tray, the B/F apparatus configured to directly wash and separate one or more reaction vessels of the reaction tray;
wherein the reaction tray further comprises an outer circle of the plurality of circles of the reaction vessel positions, the outer circle comprising reaction vessel positions configured for implementing a washing function of one or more reaction vessels positioned at the outer circle of the reaction tray, wherein the reaction vessel positions of the outer circle are also configured for implementing a partial incubation function associated with a process of carrying the reaction vessels to the B/F apparatus; and
wherein a total incubation time t implemented by the rotating apparatus satisfies $t=t_1+t_0$, $t_0 \geq 0$, the time to is a remaining time of incubation after the selected reaction vessel is transferred to a reaction vessel position of the outer circle, and after the incubation time of $t_1$ is completed in the incubation position.

4. The immunoassay analyzer according to claim 3, wherein the total forward angle $\Omega$ of the selected reaction vessel in the incubation position with the rotating apparatus comprises at least one value greater than 360°, that is, the variable incubation time $t_1$ comprises at least one value greater than $(360°/\theta)T$.

5. The reaction incubation apparatus according to claim 1, wherein the plurality of circles of reaction vessel positions comprises four circles of reaction vessel positions, wherein the four circles comprise the outer circle and the at least one inner circle comprises three inner circles.

6. The immunoassay analyzer according to claim 3, wherein the plurality of circles of reaction vessel positions comprises four circles of reaction vessel positions, wherein the four circles comprise the outer circle and the at least one inner circle comprises three inner circles.

7. The reaction incubation apparatus according to claim 1, wherein the total incubation time t implemented by the rotating apparatus satisfies $t=t_1+t_0$, $t_0>0$.

8. The immunoassay analyzer according to claim 3, wherein the total incubation time t implemented by the rotating apparatus satisfies $t=t_1+t_0$, $t_0>0$.

* * * * *